(12) United States Patent
Ginter et al.

(10) Patent No.: US 9,549,058 B2
(45) Date of Patent: *Jan. 17, 2017

(54) DEVICE INDEPENDENT CALLER DATA ACCESS FOR EMERGENCY CALLS

(71) Applicant: TeleCommunication Systems, Inc., Annapolis, MD (US)

(72) Inventors: Thomas Ginter, Bellevue, WA (US); Salman Ali, Issaquah, WA (US); Tim Pann, Shoreline, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,145

(22) Filed: Feb. 29, 2016

(65) Prior Publication Data
US 2016/0182706 A1 Jun. 23, 2016

Related U.S. Application Data

(63) Continuation of application No. 13/967,699, filed on Aug. 15, 2013, now Pat. No. 9,313,638.
(Continued)

(51) Int. Cl.
*H04W 4/22* (2009.01)
*H04M 1/57* (2006.01)
(Continued)

(52) U.S. Cl.
CPC ........... *H04M 1/72536* (2013.01); *H04M 1/57* (2013.01); *H04M 1/575* (2013.01);
(Continued)

(58) Field of Classification Search
None
See application file for complete search history.

(56) References Cited

U.S. PATENT DOCUMENTS 7,567,661 B1 * 7/2009 Wood ................. H04M 3/2218
379/134
8,570,989 B1 * 10/2013 Mahler ................. H04W 8/245
455/432.1

(Continued)

*Primary Examiner* — Lester Kincaid
*Assistant Examiner* — Daniel G Bassett
(74) *Attorney, Agent, or Firm* — Tarolli, Sundheim, Covell & Tummino LLP (57) ABSTRACT

Device independent access to stored caller data during an emergency communications event. A call server intercepts an emergency call and determines the capabilities of a calling device. Based on calling device capability, the call server uses one or more of the following device independent methods to ascertain a caller identity, independent of a calling device: interactive voice response redirect, HTTP authentication, SIP INFO method, biometric recognition, human interaction, and alternate number dialing. A caller identity is then used to query a subscriber database for a unique caller profile database key (CPDBK) assigned to the caller (unless a CPDBK is already determined). A call server uses a CPDBK to query a caller profile database (CPDB) for relevant caller data. Relevant caller data and the intercepted emergency communications event are then passed to an emergency call processing system, whereby relevant caller data may be used to more effectively address an emergency situation.

20 Claims, 8 Drawing Sheets

Related U.S. Application Data

(60) Provisional application No. 61/683,506, filed on Aug. 15, 2012.

(51) Int. Cl.
  *H04M 1/725*  (2006.01)
  *H04M 3/42*  (2006.01)
  *H04W 12/00*  (2009.01)

(52) U.S. Cl.
  CPC ......... *H04M 3/42068* (2013.01); *H04W 4/22* (2013.01); *H04W 12/00* (2013.01)

(56) References Cited

U.S. PATENT DOCUMENTS

| | | | |
|---|---|---|---|
| 2006/0031684 A1* | 2/2006 | Sharma | H04M 1/0264 713/186 |
| 2006/0128357 A1* | 6/2006 | Suryanarayana | H04M 3/42068 455/404.2 |
| 2008/0026728 A1* | 1/2008 | Snapp | H04L 12/66 455/414.1 |

* cited by examiner

DEVICE INDEPENDENT CALLER DATA ACCESS FOR EMERGENCY CALLS

The present invention is a continuation of U.S. Appl. Ser. No. 13/967,699, entitled "Device Independent Caller Data Access for Emergency Calls", filed on Aug. 15, 2013; which claims priority from U.S. Provisional No. 61/683,506, filed Aug. 15, 2012, entitled "Device Independent Caller Data Access for Emergency Calls", the entirety of both of which are expressly incorporated herein by reference.

BACKGROUND OF THE INVENTION

1. Field of the Invention

This invention relates generally to wireless telecommunication. More particularly, it relates to public safety emergency services.

2. Background of Related Art

Caller location is the only data that is currently routed to emergency dispatch personnel with an emergency communications event. While caller location is sufficient to dispatch emergency responders to the site of an emergency, caller location does not help emergency responders to more effectively alleviate an emergency situation.

In a recently proposed technology, stored caller data is routed to emergency dispatch personnel with an emergency communications event. Stored caller data typically includes rich subscriber information, e.g., an emergency contact list, medical data, drug history, allergies, etc., that may be of use to emergency dispatch personnel in the event of an emergency.

In accordance with the proposed technology, when an emergency call is made, call data (e.g. caller profile data, caller location, etc.) is ascertained based on calling device information, such as a call back number (CBN). Calling device information is sufficient to determine caller location. However, issues arise when device dependant data is used to retrieve stored caller data for routing with an emergency communications event. For instance, many times, a caller may use a device that is not their own to initiate an emergency communications event. If stored caller data is retrieved based on calling device information, and a caller is using somebody else's device to initiate an emergency communications event, then that communications event is likely routed to emergency dispatch personnel with irrelevant caller data.

SUMMARY

Methods and an apparatus for providing device independent access to stored caller data during an emergency communications event (e.g. a 911 call), comprises a call server. In accordance with the principles of the present invention, an inventive call server intercepts an emergency communications event (e.g. a 911 call) and determines the capabilities of a calling device, e.g., hypertext transfer protocol (HTTP) capabilities, short message service (SMS) capabilities, dual tone multi-frequency (DTMF) signaling capabilities, etc. Based on calling device capability, the call server uses one or more of the following device independent methods to ascertain a caller identity, independent of a calling device: interactive voice response (IVR) redirect, hypertext transfer protocol (HTTP) authentication, session initiation protocol (SIP) INFO method, biometric recognition, human interaction, and/or alternate number dialing.

Once caller identity is established, the call server queries a subscriber database for a unique caller profile database (CPDB) key assigned to the caller (unless a caller profile database (CPDB) key is already determined). The call server then uses the unique caller profile database (CPDB) key to query a caller profile database (CPDB) for relevant caller data. A unique caller profile database (CPDB) key points to a specific caller profile stored in the caller profile database (CPDB).

In accordance with the principles of the present invention, a caller profile database (CPDB) maintains caller profiles for individual subscriber entities, for use during an emergency communications event. A caller profile stored in a caller profile database (CPDB) preferably contains rich subscriber information, e.g., medical history, allergy lists, emergency contact lists, etc., that may be of use to emergency dispatch personnel in the event of an emergency.

In accordance with the principles of the present invention, caller profile data obtained for an emergency services caller is routed with an emergency communications event to an emergency call processing system (e.g. an emergency services IP network (ESInet)). Emergency dispatch personnel (e.g. a public safety answering point (PSAP)) may then use received caller data to more effectively address an emergency situation.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides methods and an apparatus for providing device independent access to stored caller data during an emergency communications event.

Recently, it has been proposed that a caller profile database (CPDB) maintain caller profiles for individual subscriber entities, for use during an emergency communications event. Caller profiles preferably contain rich subscriber information (e.g., an emergency contact list, medical data, an allergy list, drug history, etc.), that may be of use to emergency dispatch personnel in the event of an emergency. In accordance with the proposed technology, caller profile data is routed to emergency dispatch personnel in accompany to each emergency communications event initiated thereto.

Conventionally, when an emergency call is made, call data, e.g., caller identity, caller location, caller profile data, etc., is ascertained based on calling device information, such as a callback number (CBN). However, the present inventors have appreciated that issues arise when calling device information is to be used to retrieve caller specific profile data for an emergency services caller. In particular, the present inventors have appreciated that, many times, a caller may initiate an emergency communications event from a device that is not their own. If stored caller data is retrieved and routed with an emergency communications event based on calling device information, and a caller is using somebody else's device to initiate an emergency communications event, then that communications event is likely routed to emergency dispatch personnel with irrelevant caller data.

The present invention provides device independent methods for accessing stored caller data during an emergency communications event (e.g. a 911 call) to ensure that accurate caller data is routed with an emergency communications event, even in the case that a caller is using somebody else's device to initiate the event.

Figure 1:
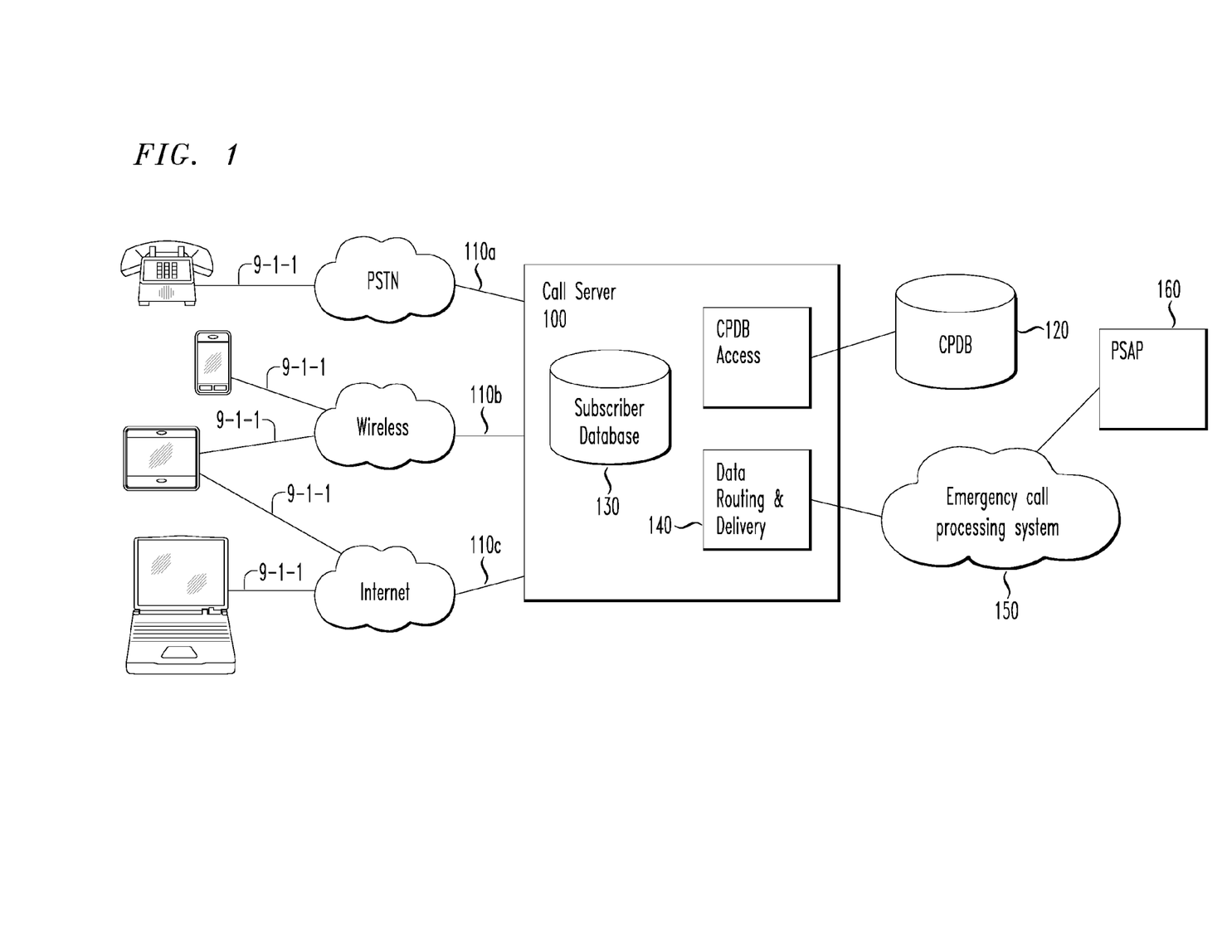
FIG. 1 depicts an exemplary network structure for providing device independent access to stored caller data during an emergency communications event, in accordance with the principles of the present invention.

In accordance with the principles of the present invention, an inventive call server intercepts an emergency communications event and obtains caller data preprovisioned for an emergency services caller, via methods independent of a calling device FIG. 1 depicts an exemplary call server, in accordance with the principles of the present invention.

In particular, as depicted in FIG. 1, an inventive call server 100 intercepts emergency communications events (e.g. 911 calls) 110a-110c and retrieves caller data preprovisioned for identified calling entities, from a centralized caller profile database (CPDB) 120. In accordance with the principles of the present invention, a caller profile database (CPDB) 120 maintains caller profiles for individual subscriber entities, and is housed, maintained, and updated by an entity other than the inventive call server 100.

In accordance with the principles of the present invention, a subscriber database 130 is housed on the inventive call server 100. A subscriber database 130 maintains a mapping of subscriber entities and unique caller profile database (CPDB) keys. A caller profile database (CPDB) key points to a specific caller profile stored in the caller profile database (CPDB) 120. In accordance with the principles of the present invention, a unique caller profile database (CPDB) key is used to retrieve a caller profile preprovisioned for an identified calling entity, during an emergency communications event.

As portrayed in FIG. 1, the inventive call server 100 routes and delivers 140 caller profile data obtained for an emergency services caller to an emergency call processing system 150. There, caller data is subsequently forwarded to an appropriate public safety answering point (PSAP) (i.e. emergency dispatch personnel) 160.

Figure 2:
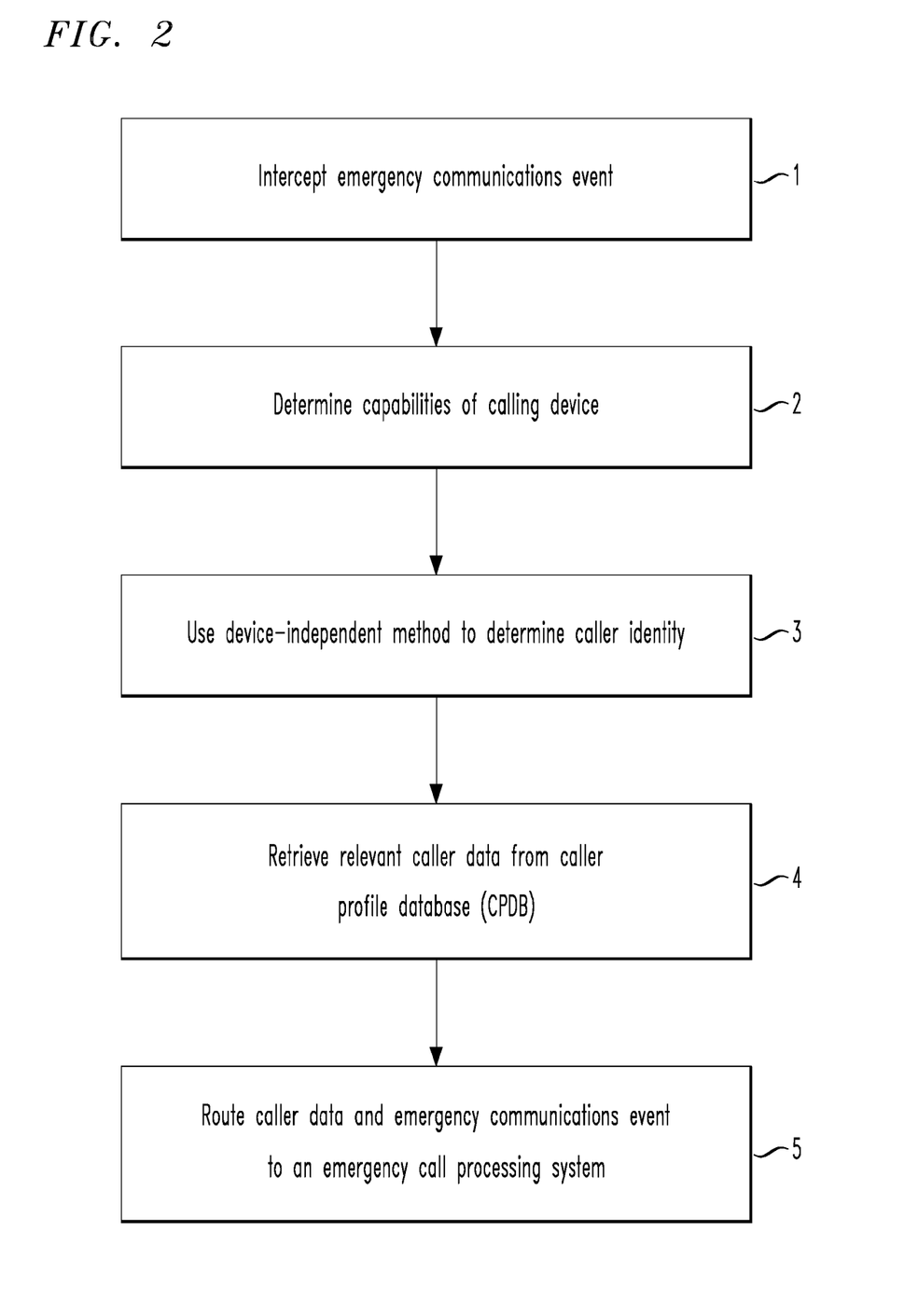
FIG. 2 depicts an exemplary method for providing device independent access to stored caller data during an emergency communications event, in accordance with the principles of the present invention.

FIG. 2 depicts an exemplary method for providing device independent access to stored caller data during an emergency communications event, in accordance with the principles of the present invention.

In particular, as depicted in steps 1 and 2 of FIG. 2, a call server 100 intercepts an emergency communications event and uses device capability detection functionalities to determine the capabilities of an originating communications device, e.g., HTTP capabilities, wireless capabilities, DTMF capabilities, etc.

In accordance with the principles of the present invention, the inventive call server 100 preferably determines the capabilities of an originating communications device 130 via analysis of an incoming trunk type and via identification of a signaling type carried thereon. For instance, the inventive call server 100 considers an emergency services call carried on incoming public switched telephone network (PSTN) trunks (i.e. integrated services digital network user part (ISUP) signaling) as having been originated on a plain old telephone service (POTS) device, and capable of dual-tone multi-frequency (DTMF) signaling. Moreover, the inventive call server 100 considers an emergency services call carried on incoming wireless trunks to have been originated on a wireless device and capable of performing wireless functionalities. Additional information regarding the capabilities of a wireless device is determined via Interim Standard 41 (IS41) signaling (code division multiple access (CDMA)), mobile application part (MAP) signaling (global system for mobile communications (GSM)) and/or camel application part (CAP) signaling (GSM intelligent network). Furthermore, the inventive call server 100 considers an emergency services call coming in on session initiation protocol (SIP) trunks and carrying SIP signaling as having been originated on a device with voice over internet protocol (VoIP) capabilities (in accordance with reference (RFC) 3261). Likewise, the inventive call server considers an emergency communications event carried on an incoming data session to have been initiated via a hypertext transfer protocol (HTTP) client and originated on a device with web capabilities. Further, a short message service (SMS) request for caller profile database (CPDB) information is considered originated on a device with SMS capabilities.

As shown in step 3 of FIG. 2, following device capability detection the inventive call server 100 uses one or more of the following device independent methods to determine and authenticate the identity of an emergency services caller, independent of a calling device: interactive voice response (IVR) redirect, session initiate protocol (SIP) INFO method, hypertext transfer protocol (HTTP) authentication, biometric recognition, human interaction, and/or alternate number dialing.

Once a caller identity is established, the call server 100 accesses a caller profile database (CPDB) 120 to retrieve caller profile data preprovisioned for the emergency services caller, as depicted in step 4. In step 5, relevant caller data is routed with the intercepted emergency communications event to an emergency call processing system 150, whereupon a public safety answering point (PSAP) (i.e. emergency dispatch personnel) 160 may use the caller data to better address an emergency situation.

In accordance with the principles of the present invention, a device independent caller identification method is selected for an emergency communications event based on calling device capabilities.

For instance, a device independent IVR redirect method is preferably used to ascertain a caller identity for an emergency services call originated on a device that has dual-tone multi-frequency (DTMF) signaling (e.g. a landline phone, a simple cell phone, etc.) capabilities, only.

Figure 3:
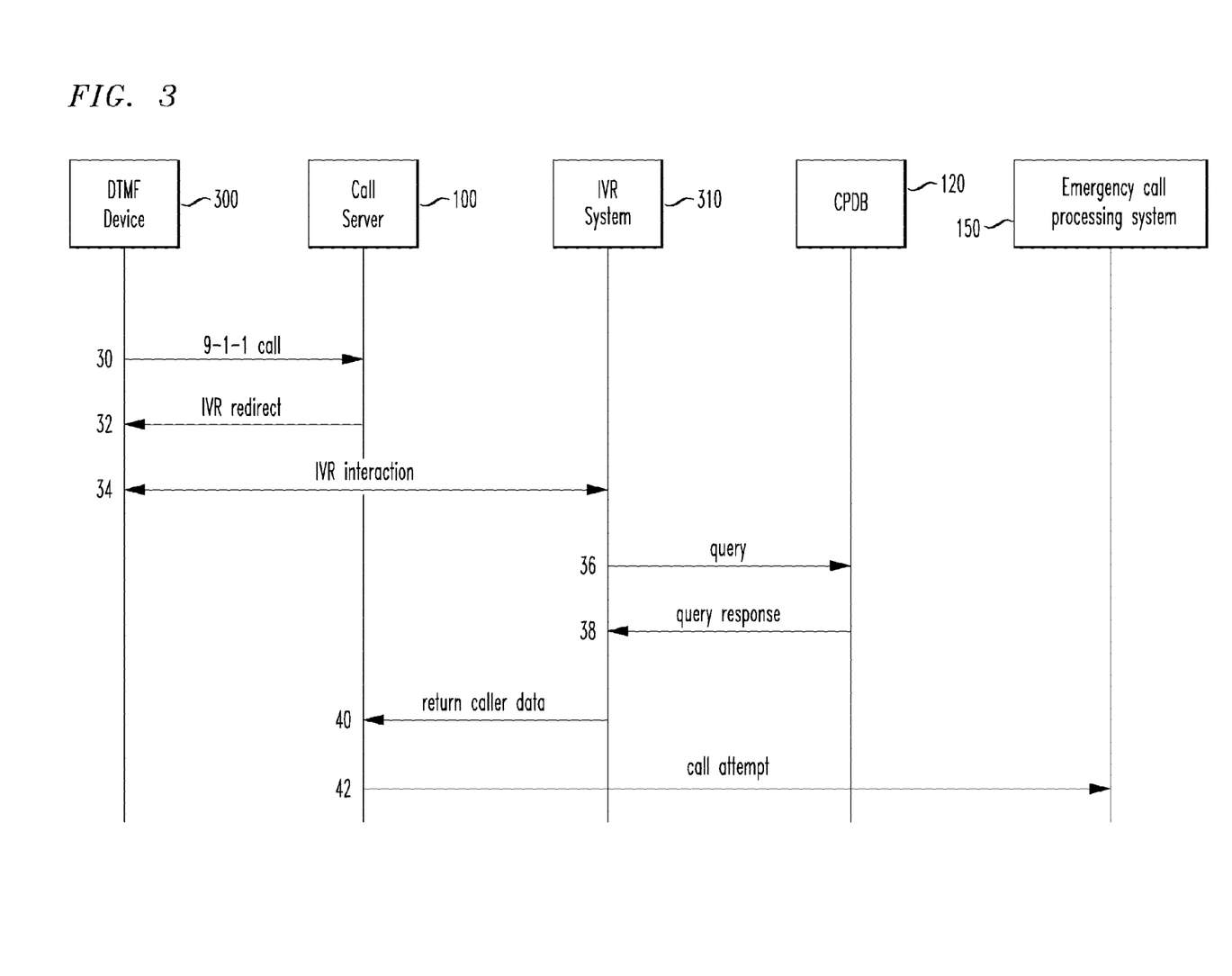
FIG. 3 depicts an exemplary device independent IVR redirect method used to ascertain a caller identity and pull caller profile database (CPDB) information during an emergency communications event, in accordance with the principles of the present invention.

FIG. 3 depicts an exemplary device independent IVR redirect method used to ascertain a caller identity and pull caller profile database (CPDB) information during an emergency communications event, in accordance with the principles of the present invention.

In particular, as depicted in step 30 of FIG. 3, a call server 100 intercepts an emergency communications event and determines that an originating communications device 300 is DTMF capable, only, e.g., a landline phone, a simple cell phone, etc. In step 32, the call server 100 redirects the emergency communications event to an IVR system 310, with access to a caller profile database (CPDB) 120. As shown in step 34, on receiving prompts from the IVR system 310, an emergency services caller provides his/her unique caller profile database (CPDB) key, and any additional authentication information (e.g., date of birth (DOB), etc.), via DTMF digits. In step 36, the IVR system 310 uses information supplied by the emergency services caller to query a caller profile database (CPDB) 120 for relevant caller data. In steps 38 and 40, relevant caller data is obtained for the emergency services caller and returned to the inventive call server 100. The call server 100 then routes relevant caller data and the emergency services call to an emergency call processing system 150, as portrayed in step 42.

In accordance with the principles of the present invention, a caller may also request to be redirected to an IVR system 310 following emergency call setup.

Figure 4:
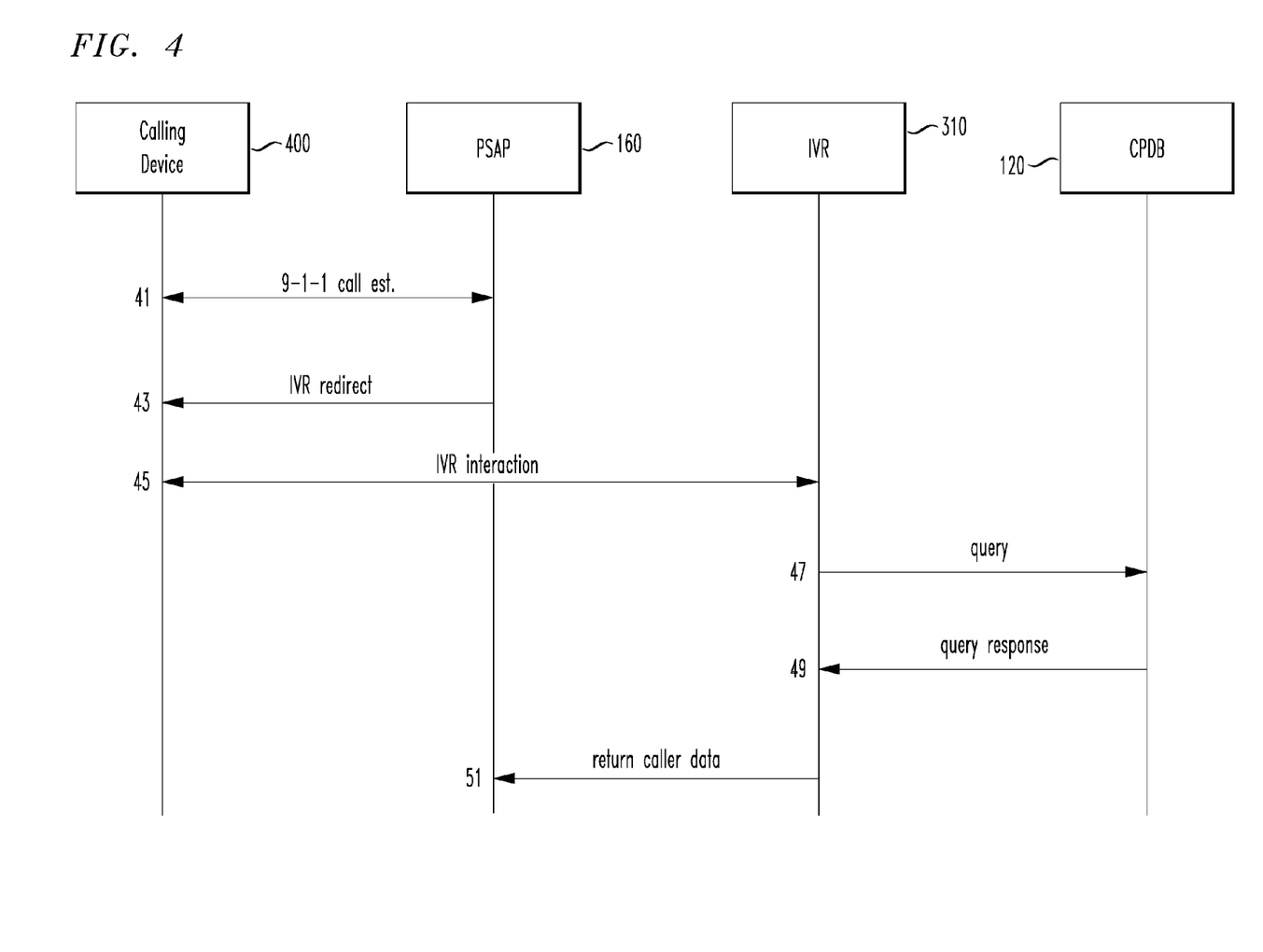
FIG. 4 depicts exemplary IVR redirect following emergency call setup, in accordance with the principles of the present invention.

FIG. 4 depicts exemplary IVR redirect following emergency call setup, in accordance with the principles of the present invention.

In particular, once an emergency communications event is routed to a public safety answering point (PSAP) 160, a caller may enter a specific dual-tone multi-frequency signaling (DTMF) code (step 41) via a calling device 400, to request a redirect (step 43) to an IVR system 310. Upon redirect, a caller is prompted to enter his/her unique caller profile database (CPDB) key, and any additional authentication information, e.g., a date of birth (DOB), etc., via DTMF digits (step 45). As depicted in steps 47 and 49, the IVR system 310 then uses supplied caller information to obtain relevant caller data from a caller profile database (CPDB) 120. Relevant caller data is then routed back to the public safety answering point (PSAP) 160, as portrayed in step 51.

In accordance with the principles of the present invention, a device independent hypertext transfer protocol (HTTP) authentication method is preferably used to ascertain a caller identity for an emergency communications event originated on a web-enabled device (e.g. a thin client application on a smart device).

Figure 5:
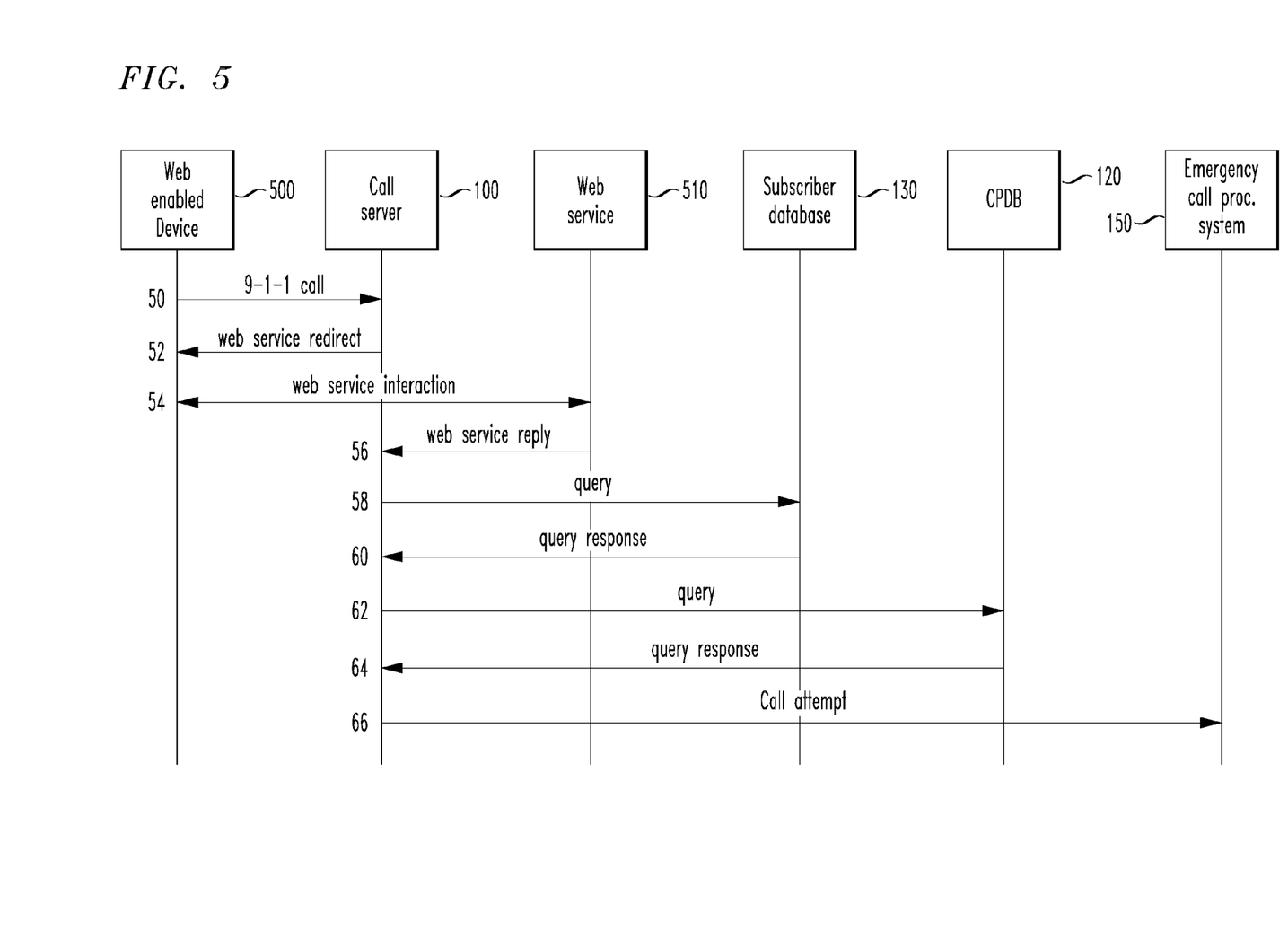
FIG. 5 depicts an exemplary device independent HTTP authentication method used to ascertain a caller identity and pull caller profile database (CPDB) information during an emergency communications event, in accordance with the principles of the present invention.

FIG. 5 depicts an exemplary device independent HTTP authentication method used to ascertain a caller identity and pull caller profile database (CPDB) information during an emergency communications event, in accordance with the principles of the present invention.

In particular, as depicted in step 50 of FIG. 5, an emergency communications event originated on a web-enabled device (an initiated via an HTTP client) 500 is received on the inventive call server 100. In step 52, the call server 100 identifies 100 the calling device 500 as web-enabled and redirects the emergency services caller to an emergency call web service 510. As portrayed in step 54, the emergency call web service 510 prompts the emergency services caller to provision caller identification credentials into a web form. As shown in step 56, the web service returns caller information provisioned in to the web form to the call server 100, and the call server 100 uses supplied caller information to ascertain a caller identity. In step 58, the call server 100 queries a subscriber database 130 for a caller profile database (CPDB) key assigned to the identified caller (unless a caller profile database (CPDB) key is already determined). As depicted in steps 60 and 62, the subscriber database 130 returns the caller's unique caller profile database (CPDB) key to the call server 100 and the call server 100 uses the key to query a caller profile database (CPDB) 120 for relevant caller data. In steps 64 and 66, the call server 100 retrieves relevant caller data from the caller profile database (CPDB) 120 and then passes relevant caller data with the intercepted emergency communications event to an emergency call processing system 150.

In accordance with the principles of the present invention, a device independent session initiation protocol (SIP) INFO method is preferably used to ascertain a caller identity and retrieve stored caller data for an emergency communications event originated on a device with VoIP capabilities. In accordance with reference (RFC) 6086, a SIP INFO message carries application level information between end points using a SIP dialog signaling path. The purpose of a SIP INFO message is not to update characteristics of a SIP dialog or session, but rather to enable applications using a SIP session to exchange information (which may update the state of those applications).

Figure 6:
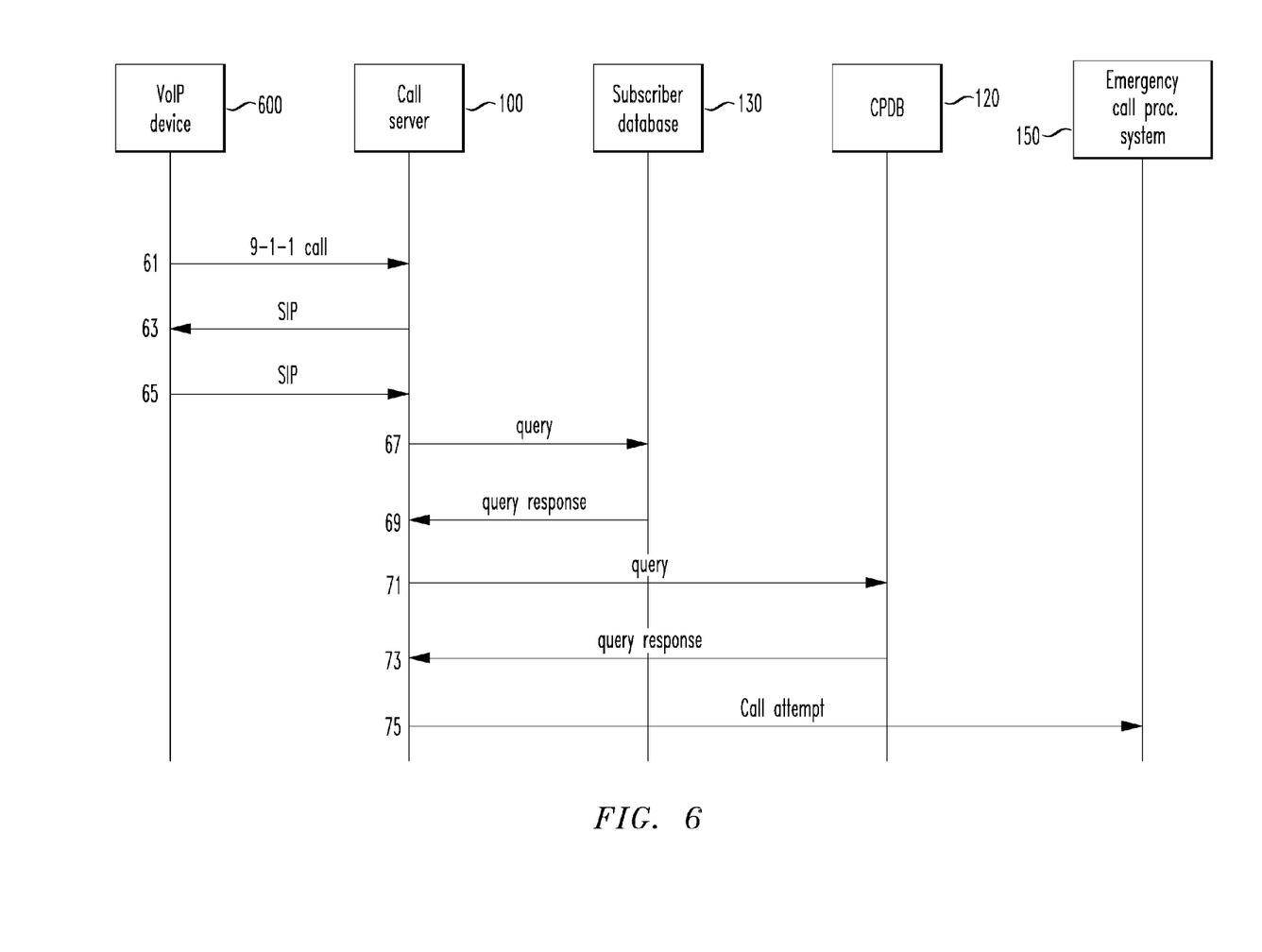
FIG. 6 depicts an exemplary device independent SIP INFO method used to ascertain a caller identity and pull caller profile database (CPDB) information during an emergency communications event, in accordance with the principles of the present invention.

FIG. 6 depicts an exemplary device independent SIP INFO method used to ascertain a caller identity and pull caller profile database (CPDB) information during an emergency communications event, in accordance with the principles of the present invention.

In particular, as depicted in step 61 of FIG. 6, an emergency communications event originated on a VoIP-capable device 600 is received on the inventive call server 100. In step 63, the call server 100 identifies the calling device 600 as having VOIP capabilities, and sends a request for caller identification information to the originating communications device, via SIP signaling. As depicted in step 65, a caller provisions identification credentials into a SIP INFO message and routes the SIP INFO message back to the call server 100. The call server 100 then uses caller identification credentials received in the SIP INFO message to ascertain a caller identity. In step 67, the call server 100 queries a subscriber database 150 for a unique caller profile database (CPDB) key assigned to the identified calling entity (unless a caller profile database (CPDB) key is already determined). As shown in steps 69 and 71, the call server 100 receives the caller profile database (CPDB) key assigned to the caller and uses the key to query a caller profile database (CPDB) 120 for relevant caller data. In steps 73 and 75, relevant caller data is returned to the call server 100 and the call server 100 routes relevant caller data and the intercepted emergency communications event to an emergency call processing system 150.

In accordance with the principles of the present invention, an inventive device independent biometric recognition method is preferably used to ascertain a caller identity and retrieve stored caller data for an emergency communications event originated on a device capable of obtaining and sending biometric data.

Figure 7:
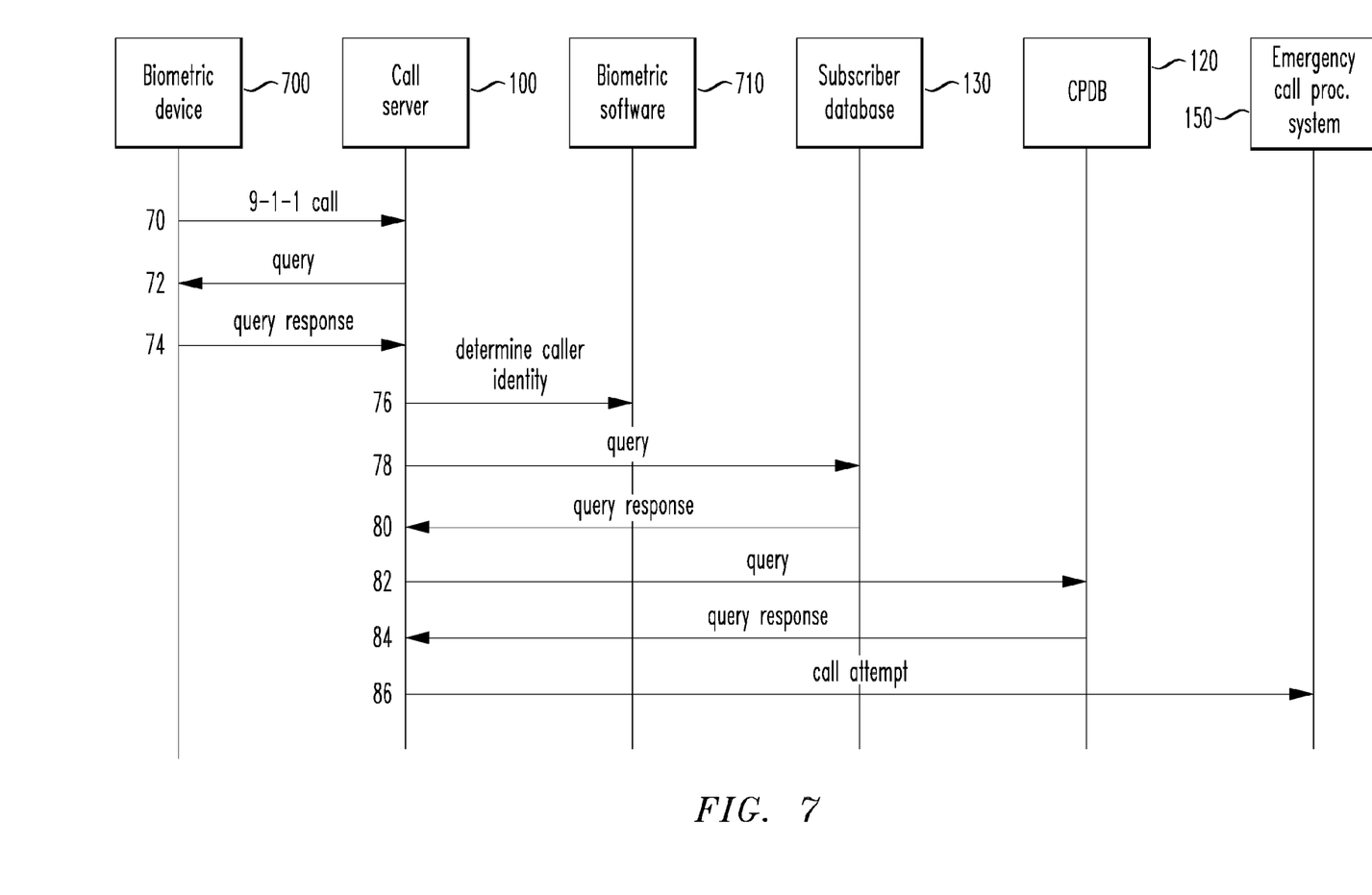
FIG. 7 depicts an exemplary device independent biometric recognition method used to ascertain a caller identity and pull caller profile database (CPDB) information during an emergency communications event, in accordance with the principles of the present invention.

FIG. 7 depicts an exemplary device independent biometric recognition method used to ascertain a caller identity and pull caller profile database (CPDB) information during an emergency communications event, in accordance with the principles of the present invention.

In particular, as depicted in step 70 of FIG. 7, an emergency communications event originated on a device 700 capable of obtaining and routing biometric information, is received on the inventive call server 100. In step 72, the call server 100 identifies the originating communications device 700 as a biometric-enabled device, and sends a request for biometric data to the originating communications device 700. Exemplary biometric data includes: a thumb print, a face picture, a voice sample, etc. In steps 74 and 76, the call server 100 receives biometric data gathered for an emergency services caller from the originating communications device 700, and subsequently employs conventional biometric software 710 to ascertain a caller identity based thereon. For example, a call server 100 may employ conventional face recognition software to determine a caller identity based on a face picture of an emergency services caller. Moreover, the call server 100 may maintain a database of prerecorded voice samples for individual subscriber entities. In this case, if a voice sample received for an emergency services caller matches a stored voice sample, caller identity is established.

As shown in step 78, once caller identity is established, the call server 100 queries a subscriber database 130 for a caller profile database (CPDB) key assigned to the caller (unless a caller profile database (CPDB) key is already determined). In steps 80 and 82, the call server receives the caller profile database (CPDB) key assigned to the caller and uses the key to query a caller profile database (CPDB) 120 for relevant caller data. In steps 84 and 86, caller data is returned to the call server 100 and subsequently passed to an emergency call processing system 170.

In accordance with the principles of the present invention, human interaction may also be used to perform device independent caller identification during an emergency communications event. In particular, emergency dispatch personnel (a public safety answering point (PSAP)) 160 may request caller identification information from an emergency services caller following emergency call setup. Caller identification information may then be used to access relevant caller profile database (CPDB) 120 information via a web interface.

Alternate number dialing is yet another device independent method that may be used to ascertain a caller identity during an emergency communications event. In accordance with the principles of the present invention, an emergency communications event initiated via alternate number dialing is routed directly to the inventive call server 100. To enable alternate number dialing, a unique emergency services number must be assigned to a subscriber entity.

Figure 8:
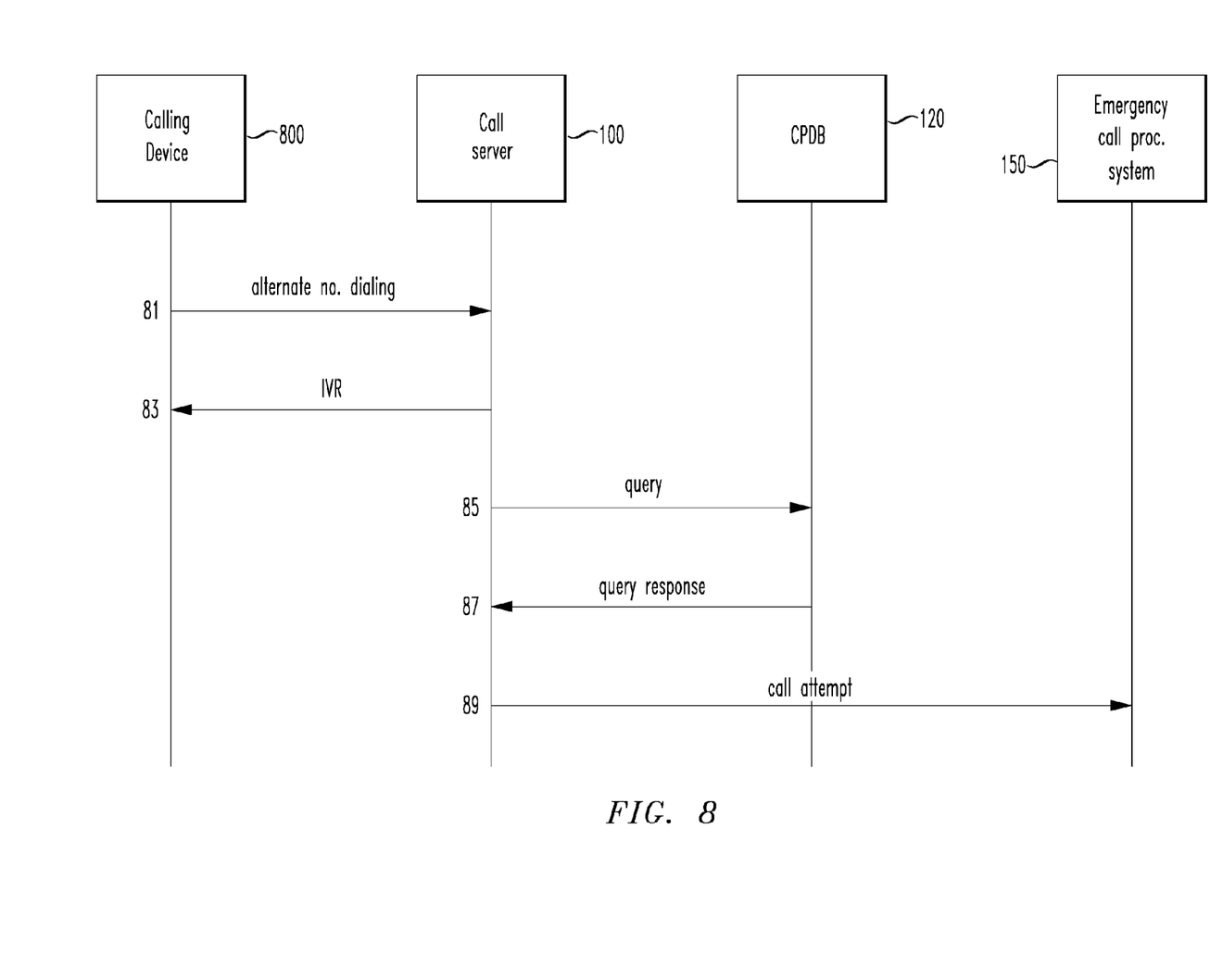
FIG. 8 depicts an exemplary device independent alternate number dialing method used to ascertain a caller identity and pull caller profile database (CPDB) information during an emergency communications event, in accordance with the principles of the present invention.

FIG. 8 depicts an exemplary device independent alternate number dialing method used to ascertain a caller identity and pull caller profile database (CPDB) information during an emergency communications event, in accordance with the principles of the present invention.

In particular, a caller dials a unique emergency services number, seeking emergency services. As depicted in step 81, an emergency services request initiated via alternate number dialing establishes a call between an originating communications device 800 and the inventive call server 100. In step 83, the call server 100 prompts the emergency services caller to enter a unique caller profile database (CPDB) key via DTMF digits. In step 85, the unique caller profile database (CPDB) key furnished by the emergency services caller is used to query a caller profile database (CPDB) 120 for relevant caller data. As depicted in step 87, the caller profile database (CPDB) 120 returns relevant caller data to the inventive call server 100. In step 89, the call server 100 initiates a call to an emergency call processing system 150 on behalf of the emergency services caller and routes relevant caller data therewith.

In accordance with the principles of the present invention, caller data retrieved for an emergency services caller can be routed to an emergency call processing system 150 by reference or by value. In particular, if a public safety answering point (PSAP) 160 in an emergency call processing system 150 is capable of receiving session initiation protocol (SIP) signaling, then caller profile information is embedded as an extensible markup language (XML) attachment in the body of a SIP signaling message and sent to the public safety answering point (PSAP) 160. Alternatively, a reference uniform resource identifier (URI) or a unique caller profile database (CPDB) key (automatic number identification (ANI), pseudo automatic number identification (pANI)) can be delivered to a public safety answering point (PSAP) 160 with an emergency communications event. Emergency dispatch personnel 160 may then use the reference URI/unique key to query a caller profile database (CPDB) 120 for relevant caller data, following the establishment of an emergency services call.

The present invention enables emergency dispatch personnel 160 to make faster life saving decisions and to provide emergency services more rapidly. Moreover, rather than just dispatching general help, the present invention enables emergency dispatch personnel 160 to provide more specific assistance (e.g., fire personnel, medical personnel, etc.) to an emergency services caller. The present invention also relieves an emergency services caller of having to communicate his/her own medical history to medical staffers/emergency dispatch personnel 160.

In accordance with the principles of the present invention, routing relevant caller data to emergency dispatch personnel 160 with an emergency communications event allows emergency first responders to access relevant caller data even before reaching the site of an emergency. The present invention thus leads to enhanced life-saving capabilities.

While the invention has been described with reference to the exemplary embodiments thereof, those skilled in the art will be able to make various modifications to the described embodiments of the invention without departing from the true spirit and scope of the invention.

What is claimed is:

1. A method of providing device independent access to stored caller data during an emergency communications event, comprising:
   intercepting an emergency communications event initiated by a given mobile device;
   determining capabilities of said initiating mobile device based on an incoming trunk type and a type of signaling carried thereon; and
   selecting at least one device independent method to ascertain a caller identity of said initiating mobile device for said emergency communications event based on said determined capabilities of said initiating mobile device.

2. The method of providing device independent access to stored caller data during an emergency communications event according to claim 1, wherein:
said selecting said at least one device independent method to ascertain a caller identity of said initiating mobile device is further based on an interactive voice response (IVR) redirect.

3. The method of providing device independent access to stored caller data during an emergency communications event according to claim 1, wherein:
said selecting said at least one device independent method to ascertain a caller identity of said initiating mobile device is further based on a hypertext transfer protocol (HTTP) authentication.

4. The method of providing device independent access to stored caller data during an emergency communications event according to claim 1, wherein:
said selecting said at least one device independent method to ascertain a caller identity of said initiating mobile device is further based on a session initiation protocol (SIP) INFO message.

5. The method of providing device independent access to stored caller data during an emergency communications event according to claim 1, wherein:
said selecting said at least one device independent method to ascertain a caller identity of said initiating mobile device is further based on biometric recognition.

6. The method of providing device independent access to stored caller data during an emergency communications event according to claim 1, wherein:
said selecting said at least one device independent method to ascertain a caller identity of said initiating mobile device is further based on an alternate dialed phone number.

7. The method of providing device independent access to stored caller data during an emergency communications event according to claim 1, further comprising:
retrieving relevant caller data relating to said ascertained caller identity, from a caller profile database (CPDB).

8. The method of providing device independent access to stored caller data during an emergency communications event according to claim 7, further comprising:
routing said caller data and said intercepted emergency communications event to an emergency call processing system.

9. The method of providing device independent access to stored caller data during an emergency communications event according to claim 7, wherein said retrieving relevant caller data comprises:
retrieving a caller profile database (CPDB) key for said initiating mobile device; and
retrieving relevant caller data from a caller profile database (CPDB) based on said caller profile database (CPDB) key.

10. The method of providing device independent access to stored caller data during an emergency communications event according to claim 7, wherein:
said caller profile database (CPDB) maintains caller profiles for individual subscriber entities.

11. The method of providing device independent access to stored caller data during an emergency communications event according to claim 10, wherein said caller profiles comprise:
rich subscriber information for use during said emergency communications event.

12. The method of providing device independent access to stored caller data during an emergency communications event according to claim 7, wherein:
said caller profile database (CPDB) key points to a specific caller profile in said caller profile database (CPDB).

13. Apparatus for providing device independent access to stored caller data during an emergency communications event, comprising:
call server means for intercepting an emergency communications event initiated by a given mobile device;
means for determining capabilities of said initiating mobile device based on an incoming trunk type and a type of signaling carried thereon; and
means for selecting at least one device independent method to ascertain a caller identity of said initiating mobile device for said emergency communications event based on said determined capabilities of said initiating mobile device.

14. The apparatus for providing device independent access to stored caller data during an emergency communications event according to claim 13, wherein:
said means for selecting selects said at least one device independent method to ascertain a caller identity of said initiating mobile device is further based on an interactive voice response (IVR) redirect.

15. The apparatus for providing device independent access to stored caller data during an emergency communications event according to claim 13, wherein:
said means for selecting selects said at least one device independent method to ascertain a caller identity of said initiating mobile device is further based on a hypertext transfer protocol (HTTP) authentication.

16. The apparatus for providing device independent access to stored caller data during an emergency communications event according to claim 13, wherein:
said means for selecting selects said at least one device independent method to ascertain a caller identity of said initiating mobile device is further based on a session initiation protocol (SIP) INFO message.

17. The apparatus for providing device independent access to stored caller data during an emergency communications event according to claim 13, wherein:
said means for selecting selects said at least one device independent method to ascertain a caller identity of said initiating mobile device is further based on biometric recognition.

18. The apparatus for providing device independent access to stored caller data during an emergency communications event according to claim 13, wherein:
said means for selecting selects said at least one device independent method to ascertain a caller identity of said initiating mobile device is further based on an alternate dialed phone number.

19. The apparatus for providing device independent access to stored caller data during an emergency communications event according to claim 13, further comprising:
means for retrieving relevant caller data relating to said ascertained caller identity, from a caller profile database (CPDB).

20. The apparatus for providing device independent access to stored caller data during an emergency communications event according to claim 13, further comprising:
means for routing said caller data and said intercepted emergency communications event to an emergency call processing system.

* * * * *